Jan. 16, 1962     L. C. ELDER     3,016,994
CONNECTOR FOR METAL STRIPS
Filed Jan. 31, 1958
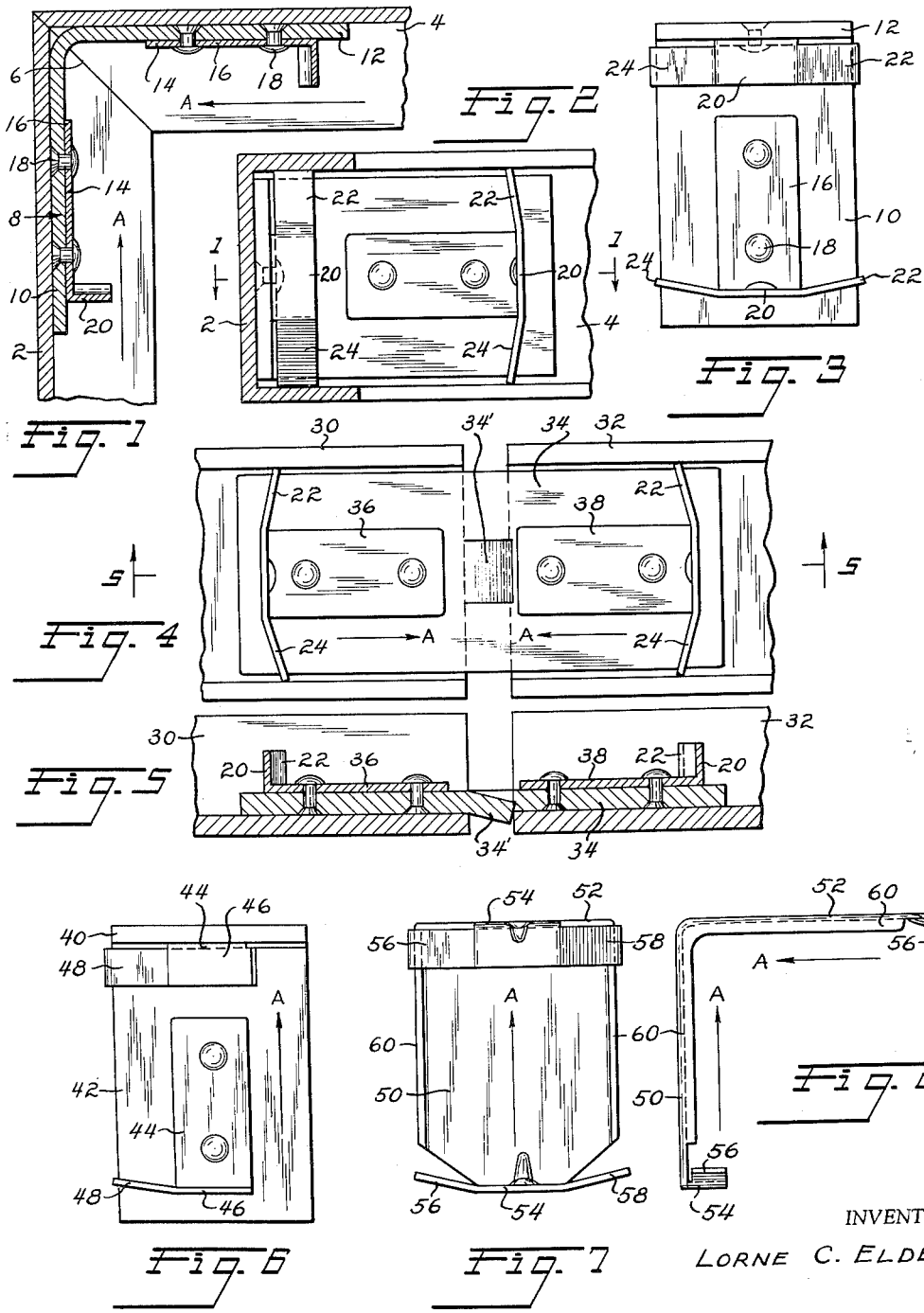
INVENTOR
LORNE C. ELDER
BY *Scrivener & Parker*
ATTORNEYS United States Patent Office 3,016,994
Patented Jan. 16, 1962

1

3,016,994
CONNECTOR FOR METAL STRIPS
Lorne C. Elder, Hamilton, Ontario, Canada, assignor to Associated Spring Corporation, Bristol, Conn., a corporation of Delaware
Filed Jan. 31, 1958, Ser. No. 712,564
5 Claims. (Cl. 189—36)

This invention relates to devices for connecting together two lengths of molding or metal extrusion such as those used to form frames, such as window frames and the like, and more particularly is intended to provide a connecting device which will permit easy, quick and permanent connection of two such lengths. It is a further object of the invention to provide a connecting device of the described type which utilizes a wedging action provided by a spring, which yields to permit two members to be connected, but which thereafter operates to prevent any separation of the two members.

The invention is described in the following specification and illustrated in the accompanying drawing, in which:

FIG. 1 is a partly sectional view, taken on line 1—1 of FIG. 2, showing two angularly related channel shaped members connected by a device in accordance with this invention;

FIG. 2 is a side elevational view of the parts shown in FIG. 1;

FIG. 3 is a side elevational view of the connecting device shown in FIGS. 1 and 2;

FIG. 4 is an elevational view showing two aligned channel members connected by a device according to this invention;

FIG. 5 is a sectional view taken on line 5—5 of FIG. 4;

FIG. 6 is an elevational view showing a modified form of the invention for connecting two channel members, and FIGS. 7 and 8 show a third embodiment of the invention.

In the manufacture of various structures such as window frames, lighting fixture frames and the like elongated members are connected together in aligned, right angular, or other angular relation to form the completed structure. In modern practice these elongated members often take the form of channel shaped metallic strips which are usually manufactured by extrusion methods and are known as extrusions and will sometimes be so referred to in this specification. It is also often necessary to connect such channel shaped extrusions in aligned relation rather than in angular relationship. My invention has to do with the provision of a new and improved device for connecting such extrusions and similar channel shaped members in either aligned or angular relation.

In devices according to this invention there is a base part, which is preferably formed of sheet metal or other suitable sheet material, and which has an outer surface adapted to be in face-to-face engagement with the inner surfaces of the bottoms of the two channel shaped members when these are in connected relation, and having also an inner surface. Obviously, this base part will have a shape conforming to the angular relation which the two channel members will have when they are connected, and will be flat if those members are to be aligned and will be angular in shape if the two members are to be angularly related. Adjacent each end of this base part, and on the inner surface thereof, there is connected at one or more so-called wing members, which wing members provide the means for preventing separation of the channel members after connection thereof by the connecting device. Each of these wings extends transversely of the base part, by which it is meant that it extends toward a side wall of the channel member when the connecting device is in

2 connecting position. Each wing member is resilient in the direction of the base part, by which is meant the direction in which the associated channel member will be moved when it is moved into connecting relation to the other channel member. Further, each wing member is angularly disposed with respect to the longitudinal axis of the base in the direction in which the associated channel member will be moved when it is moved into connecting relation to the other channel member or, expressed otherwise, each wing member is bent away from the adjacent end of the base part. Further, each wing member is of such a length that its outer end lies outside the adjacent side edge of the base part, whereby its outer end will engage the inner surface of a side wall of the associated channel member when the connecting device is in connecting position.

An embodiment of the invention is disclosed in FIGS. 1, 2 and 3, in which there are illustrated two elongated channel shaped metallic extrusions 2, 4 which are to be connected in right angular relation to form two sides of a complete structure and the ends of which are therefore appropriately cut, as shown at 6. Means are provided by the invention for connecting these two members and such means comprise a unitary, metal base part 8 which is bent to right angular shape to provide two arms 10, 12 of preferably equal length. This right angular structure is adapted to be associated with the right angular corner formed by the two channel shaped frame members 2, 4, and to have its arms 10, 12 received, respectively, within the channel shaped arms 2, 4 during and after the connection thereof. A connecting device 14 is attached to the inner, or facing, surface of each of the arms 10, 12 and each of these devices comprises a flat body part 16 connected by rivets 18 or the like to the associated arm. At its outer end each of these parts is turned at right angles in a direction away from the associated arm 10, 12 to provide an upstanding flat wall 20 which forms a continuation of the body part and is of the same width, as shown in FIGS. 2 and 3, and which extends at right angles to the direction of movement of the associated one of the channel members 2, 4 when such associated member is connected to the other, such directions being indicated by the arrows A in FIG. 1. At its ends the wall 20 is continued beyond the sides of the base member 14 to provide two wings 22, 24 each of which is bent at an obtuse angle to the wall 20 in a direction in which its associated channel member is moved when being connected to the other, which is the direction of the arrows A, or expressed otherwise, is bent from wall 20 in the direction away from the adjacent end of the base part 8. These wings 22, 24 are formed of spring metal and, as they extend beyond the side edges of the part 14, they form resilient wings extending from the central wall member 20 and angularly related thereto, as described. Further, each of these wings is of such length that its outer end lies outside the adjacent edge of the base part 8 whereby such outer end may engage the inner surface of a side wall of that one of the channel members with which it is associated.

In the use of the invention to connect two channel shaped members to form a corner of a structure, one arm 10 of a connecting device according to the invention is forced into one channel member 2 from the end thereof which will engage the other channel member, i.e. in the direction opposite to that of the arrows A of FIG. 1, the resilient wings 22, 24 flexing to permit such movement. The second channel member 4 is now placed over the second arm 12 of the connector in the desired angular relation to channel member 2 and is forced toward such member, the wings 22, 24 associated with the arm 12 of the connecting member flexing to permit such movement. The two channel members are forced toward each other until the ends, which are angularly cut as shown in FIG. 1, come together to form a corner of the structure. During the entire movement of the two channel members toward each other the outer ends of the wings 22, 24 of the two connecting devices engage the inner surfaces of the side walls of the channel member and the wings themselves flex to permit such movement. When the movement is completed and the ends of the two channel members are together, the sharp end edges of the wings 22, 24 of each connecting device tightly and securely engage the material of the inner walls of the sides of the associated channel member. Any force exerted on either or both of the channel members 2, 4 to urge them apart, as in the direction opposite to those of the arrows A of FIG. 1, will cause the wings 22, 24 to exert a wedging or toggle action on the walls of the channel member which they engage, thus preventing any separation of the two channel members.

My invention also includes the provision of means for connecting two aligned channel shaped members 30, 32 in end-to-end relation, and an embodiment of the invention to accomplish this is disclosed in FIGS. 4 and 5 of the drawings. This embodiment comprises a base part 34 formed of a flat sheet of metal, to the inner surface of which there are attached two connecting devices 36, 38 which have the same construction as those disclosed in FIGS. 1, 2 and 3. These connecting devices are arranged on the base part 34 in end-to-end relation with the wings 22, 24 at opposite ends of the metal sheet and inclined backwardly toward the other connecting device, i.e., in the directions in which the two channel members are moved when they are moved toward each other to be connected, which are the directions indicated by arrows A in FIG. 4. The aligned channel shaped members 30, 32 may be slightly spaced, as shown in FIGS. 4 and 5, or they can abut, whichever is preferable. If the members are spaced the base part 34 is provided with a struck-out tongue 34' adapted to abut one edge of one of the channel shaped members to space the same. In the use of this connector, one end of the connector is pushed into the end of a channel member, the wings 22, 24 yielding to permit such movement. The second channel member is then pushed onto the other end of the connecting device, and again the wings 22, 24 at that end of the connecting device yield to permit such movement. If any force is exerted on the channel members tending to separate them, the resilient wing members 22, 24 at each end of the connector will provide a wedging action and dig into the side walls of the two channel members to prevent any separation thereof.

In accordance with the invention, and if desired, the connecting device may have only one resilient wing at each end thereof instead of the two wings 20, 22 provided in the embodiments of the invention disclosed in FIGS. 1 to 5. Such an embodiment of the invention is disclosed in FIG. 6, and comprises a base part having the arms 40, 42 which, in the illustrated form of the invention, are disposed at right angles to each other in order to connect two channel members at right angles to each other, but which may have any other angular relationship, including co-planar, in order to connect extrusions which are similarly angularly related. A connecting device 44 is attached to the inner surface of each of the arms 40, 42 and, as in the other forms of the invention, has an upstanding wall part 46 at the outer end thereof, from one side edge of which there extends a resilient wing member 48 which is bent slightly from the plan of wall member 46 in the direction in which the associated extrusion will be moved when two extrusions are connected by the device, which is the direction indicated by the arrow A in FIG. 6. In this form of the invention only one wing member 48 is provided instead of the two provided in other embodiments of the invention, but in all other respects this form of the invention is identical with the others.

Those embodiments of the invention heretofore described have been composite articles of manufacture, comprising a number of parts connected together. If desired, any connector according to this invention may be made of a single piece of metal or other suitable material, and such an embodiment of the invention is disclosed in FIGS. 7 and 8. This illustrated device comprises a single sheet of metal bent to right angular shape and therefore having the arms 50, 52. It will be understood, of course, that a unitary connector according to this embodiment of the invention may be made in any angular or flat shape desired and that the right angular shape is illustrated in FIGS. 7 and 8 only by way of example. At its outer extremity each of the arms 50, 52 is turned inwardly at right angles to form a central wall part 54 from the ends of which wings 56, 58 extend in opposite directions and are bent back from the central part 54 in the direction in which the associated extrusion will be moved onto the connector when two extrusions are connected by the connector, which is the direction indicated by the arrows A in FIGS. 7 and 8. The side edges of the arms 50, 52 of the device are turned inwardly of the device at right angles, as shown at 60 to provide rigidity and stiffness to the device and, in addition, to insure that the overall width of each of the arms 50, 52 is less than the distance between the outer extremities of the wing members 56, 58.

It is believed that the use and operation of devices according to the invention will be clear to those skilled in the art. In such use, two channel-shaped extrusions are pushed toward each other onto the two arms of the device with the two arms or parts of the device received within the two channel shaped members and in face-to-face engagement with the inner surface of the bottoms thereof. As the two extrusions are moved toward each other the outer ends of the two side wing members (or the outer end of the single side wing member 48 of FIG. 6) engage the inner surfaces of the side walls of the channel shaped members and the wing members deflect or yield to permit the extrusions to be moved completely onto the connecting device. When the two extrusions are in their final positions, which will usually be with their ends in engagement with each other, they will be held tightly in position by the wing members and any force exerted on them tending to move them apart will cause the wing members to exert a wedging or toggle action, because of their initial orientation with respect to the connecting device, thus preventing any separation of the two extrusions.

While I have described and illustrated certain embodiments of the invention, it will be apparent to those skilled in the art that other embodiments, as well as modifications of those disclosed, may be made and practiced without departing in any way from the spirit or scope of the invention, for the limits of which reference must be made to the appended claims.

What is claimed is:

1. A device for connecting together in end-to-end relation two channel shaped members, comprising a base part having an outer surface adapted to be positioned in face-to-face engagement with the inner surfaces of the bottoms of the two channel shaped members when the two are in connected relation, said base part having on its inner surface and adjacent each end thereof at least one upstanding wall forming a wing member which is resilient in the direction in which the channel shaped members move when they are connected, each of said wing members extending transversely of the base member and being of such a length at its outer extremity lies outside the side edge of the base member sufficiently to engage a side wall of the channel shaped member when the connecting device is within such member, and each of such wing members being inclined from the longitudinal axis of the connecting device in the direction in which the channel shaped member which it is adapted to engage moves when the two channel shaped members are moved toward each other to connect them thereby to provide a wedging action resisting separation of the channel shaped members after connection thereof by said device.

2. A device according to claim 1, in which the base part comprises two angularly related arms and each wing member is connected to the inner surface of one of the arms, whereby the connecting device is adapted to connect two channel shaped members in angular relation.

3. A device according to claim 1, in which the base part is flat, whereby the connecting device is adapted to connect two channel shaped members in aligned relation.

4. A device according to claim 1, in which the base part and the wing members form an integral structure made from a single piece of material.

5. A device for connecting together in end-to-end relation two channel shaped members, comprising a base part having an outer surface adapted to be positioned in face-to-face engagement with the inner surfaces of the bottoms of the two channel shaped members when the two are in connected relation and having an inner surface, an upstanding wall forming two wing members adjacent each end of said base part and connected to the inner surface thereof, the two wing members adjacent each end of said base part extending in opposite directions transversely of the base part and each being resilient in a direction longitudinal of the base part and each being of such a length that its outer end lies outside the adjacent side edge of the base part, and each being angularly disposed to the longitudinal axis of the base part in a direction away from the adjacent end of the base part thereby to provide a wedging action resisting separation of the channel shaped members after connection thereof by said device.

References Cited in the file of this patent

UNITED STATES PATENTS

| | | |
|---|---|---|
| 1,665,816 | Mautner | Apr. 10, 1928 |
| 2,666,943 | Kramcsak | Jan. 26, 1954 |
| 2,818,192 | Weiner | Dec. 31, 1957 |
| 2,910,155 | Bradner | Oct. 27, 1959 |

FOREIGN PATENTS

| | | |
|---|---|---|
| 250,299 | Switzerland | June 16, 1948 |